US012669875B2

(12) United States Patent
Tekerlek

(10) Patent No.: US 12,669,875 B2
(45) Date of Patent: Jun. 30, 2026

(54) GAME CONTROLLER INPUT DEVICE ALLOWING COMFORTABLE USER ACTUATION

(71) Applicant: Korkut Tekerlek, Winkel (CH)

(72) Inventor: Korkut Tekerlek, Winkel (CH)

( * ) Notice: Subject to any disclaimer, the term of this patent is extended or adjusted under 35 U.S.C. 154(b) by 0 days.

(21) Appl. No.: 17/922,885

(22) PCT Filed: May 3, 2021

(86) PCT No.: PCT/EP2021/061565
§ 371 (c)(1),
(2) Date: Nov. 2, 2022

(87) PCT Pub. No.: WO2021/224181
PCT Pub. Date: Nov. 11, 2021

(65) Prior Publication Data
US 2023/0168750 A1    Jun. 1, 2023

(30) Foreign Application Priority Data

May 5, 2020    (WO) ................. PCT/EP2020/062451

(51) Int. Cl.
*G06F 3/01*        (2006.01)
*G06F 3/0338*      (2013.01)
(52) U.S. Cl.
CPC ............ *G06F 3/0338* (2013.01); *G06F 3/016* (2013.01)
(58) Field of Classification Search
CPC ........ G06F 3/016; G06F 3/033; G06F 3/0338; G06F 3/0346; G06F 3/03548;
(Continued)

(56) References Cited

U.S. PATENT DOCUMENTS 5,589,828 A * 12/1996 Armstrong .......... G06F 3/03548
                                                    341/20
5,973,674 A * 10/1999 Buecker ................ G06F 3/0338
                                                    345/166
(Continued)

FOREIGN PATENT DOCUMENTS

JP            63171816 U    11/1988
JP        H07110740 A     4/1995
(Continued)

OTHER PUBLICATIONS

Japan Patent Office, Office Action, JP Application No. 2022-567264, mailed Feb. 27, 2024, 2 pages.

*Primary Examiner* — Ke Xiao
*Assistant Examiner* — Nelson Lam
(74) *Attorney, Agent, or Firm* — Mahamedi IP Law LLP

(57)        ABSTRACT

The invention relates to an input device, in particular for an electronic unit, preferably for a game controller, comprising an actuation element for the actuation of the input device by a user, having an actuation section accessible from outside the input device, wherein the actuation element can be brought into multiple actuation positions, which define an actuation range, by the user. Here, the actuation element can be displaced into the actuation positions by displacement in one or more displacement directions, which in particular lie substantially in a displacement plane. The input device furthermore comprises electronic position detection means which directly or indirectly detect an instantaneous actuation position of the actuation element. According to the invention, the actuation element is guided, linearly movably in an instantaneous stroke direction that is oriented perpendicular to a respectively instantaneous displacement direction, in the input device, and a control device is provided, by means of which, during a displacement of the actuation element in the actuation range in the one or more displacement directions, (Continued)

a stroke movement of the actuation element in the instantaneous stroke direction is controllable or controlled in a manner dependent on the displacement of the actuation element.

20 Claims, 6 Drawing Sheets

(58) Field of Classification Search
CPC ...... G06F 3/03549; G06F 3/01; G06F 3/0202;
G06F 3/0205; G06F 3/0213; G06F
3/0234; G06F 3/0304
USPC ................................. 345/161–167, 156–167
See application file for complete search history.

(56) References Cited

U.S. PATENT DOCUMENTS

| | | | | |
|---|---|---|---|---|
| 6,362,810 | B1* | 3/2002 | Matsuda | ............ G05G 9/04796 345/161 |
| 2004/0119687 | A1 | 6/2004 | Suzuki et al. | |
| 2005/0205393 | A1* | 9/2005 | Bricaud | ............... H01H 25/002 200/5 R |
| 2006/0028436 | A1* | 2/2006 | Armstrong | .......... G06F 3/03549 345/156 |
| 2009/0084214 | A1* | 4/2009 | Sakai | ..................... A43C 15/04 74/471 XY |
| 2009/0225027 | A1* | 9/2009 | Itoh | ......................... G05G 9/047 345/161 |
| 2012/0274563 | A1* | 11/2012 | Olsson | ................... G05G 9/047 345/161 |
| 2014/0083833 | A1* | 3/2014 | Desplaines | ............ H01H 21/12 200/6 A |
| 2015/0355768 | A1* | 12/2015 | Kuwahara | .......... A63F 13/2145 345/157 |
| 2017/0001106 | A1* | 1/2017 | Gassoway | ............. G05G 9/047 |
| 2018/0200617 | A1* | 7/2018 | Tiffany | ................... A63F 13/24 |
| 2020/0387187 | A1* | 12/2020 | Liang | ..................... G05G 9/047 |

FOREIGN PATENT DOCUMENTS

| | | | |
|---|---|---|---|
| JP | H08111144 | A | 4/1996 |
| JP | 2001202152 | A | 7/2001 |
| JP | 2004062447 | A | 2/2004 |

* cited by examiner

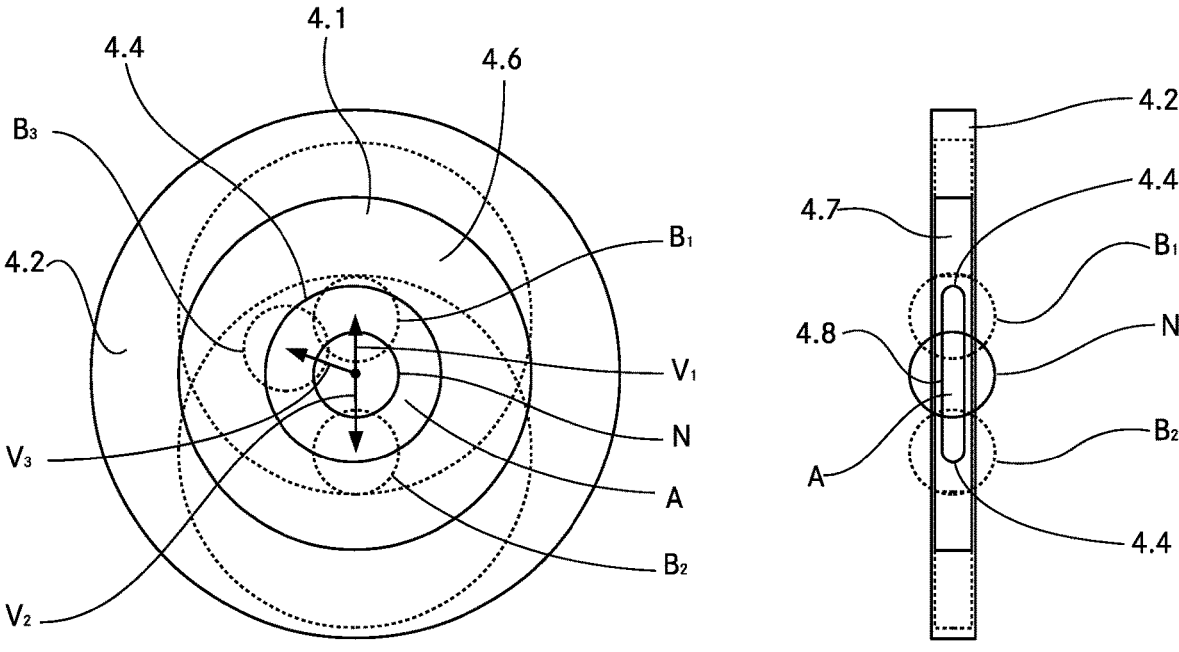
Fig. 6a                    Fig. 6b
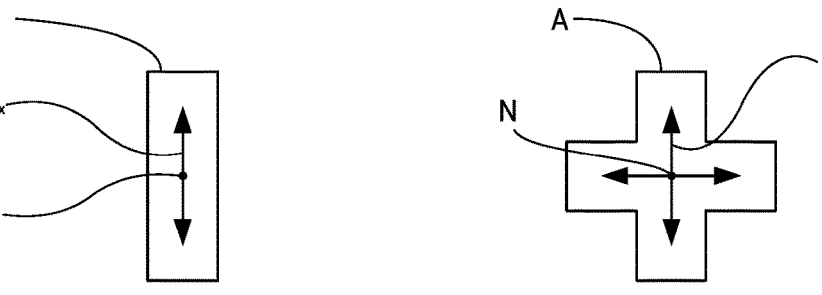
Fig. 7a                    Fig. 7b
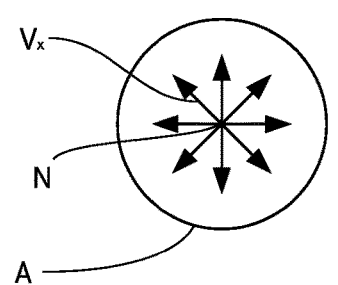          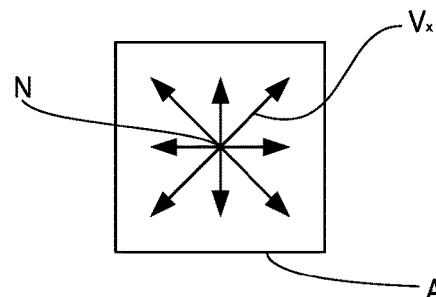
Fig. 7c                    Fig. 7d

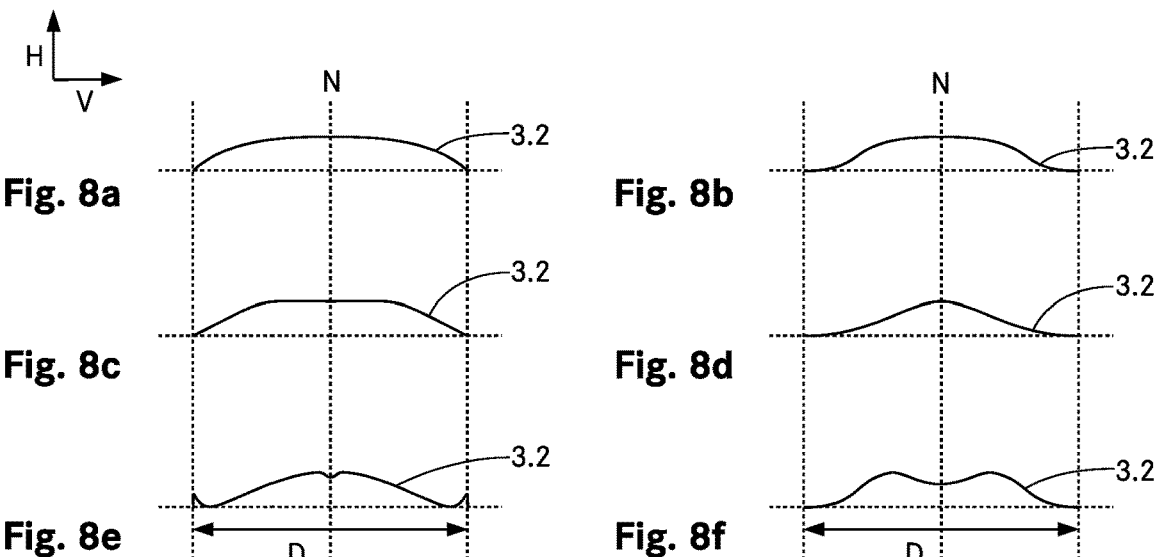
Fig. 8a
Fig. 8b
Fig. 8c
Fig. 8d
Fig. 8e
Fig. 8f
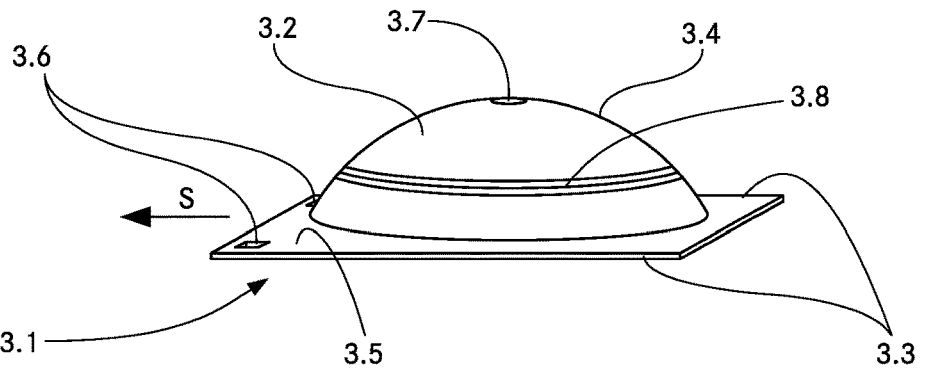
Fig. 9
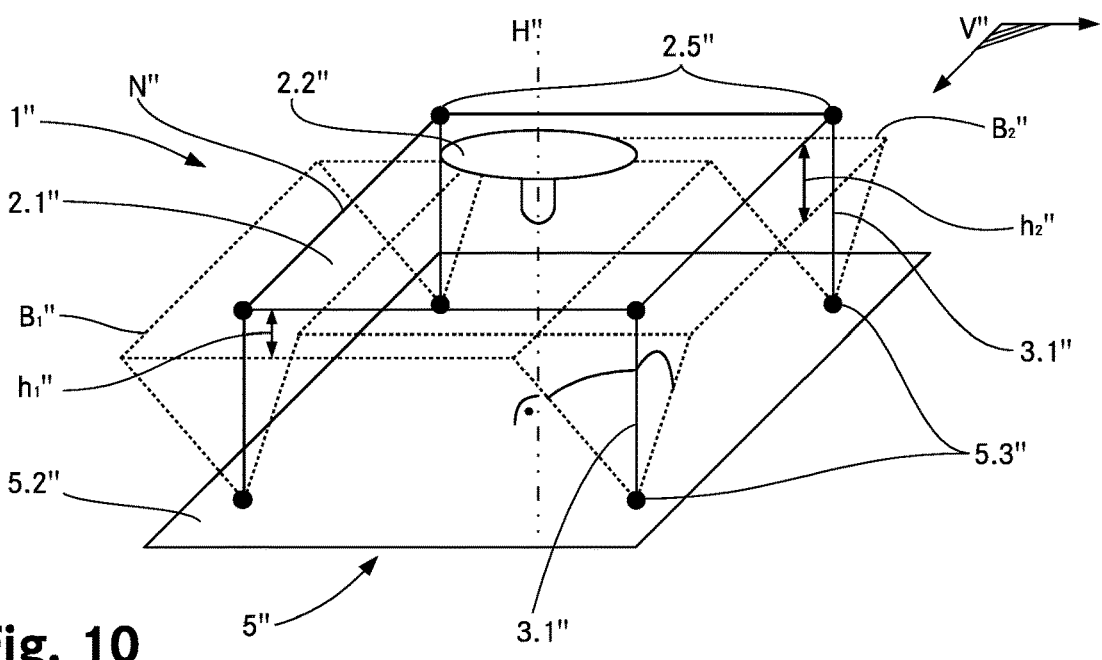
Fig. 10

GAME CONTROLLER INPUT DEVICE ALLOWING COMFORTABLE USER ACTUATION

TECHNICAL FIELD

The invention relates to an input device, in particular for an electronic unit, preferably for a game controller, comprising an actuation element for the actuation of the input device by a user, having an actuation section accessible from outside the input device, wherein the actuation element can be brought into multiple actuation positions, which define an actuation range, by the user, wherein the actuation element can be displaced into the actuation positions by displacement in one or more displacement directions, which in particular lie substantially in a displacement plane, and electronic position detection means are provided which directly or indirectly detect an instantaneous actuation position of the actuation element.

PRIOR ART

Electronic units from a large number of technical sectors nowadays increasingly have user interfaces which comprise a two-dimensional display. Such user interfaces often have input devices which enable a user, for example, to move a cursor or some other graphical object, and place it at a desired location, in the two-dimensional image plane predefined by the screen. So-called joysticks, directional sliders or analog four-point buttons are typically used here, by means of which a desired direction can be input. Directional input units can however also be used for one-dimensional inputs, such as directional sliders or scroll wheels, by means of which, for example, a cursor can be controlled sequentially through a predefined selection of entries such as a menu. Such input devices are used, for example, for GPS navigation units, for the control of a vehicle electronics system and, in particular, also in the sector of game controllers for computer game applications.

Known joysticks typically have a tiltable lever, wherein the tilting direction is mapped as a movement direction onto the two-dimensional image plane of the screen. An intensity of the input can for example be proportional to a degree of tilting. In this way, it is for example possible for a graphical object of a computer program, in particular a character in a computer game, to be positioned in the image plane or controlled in a virtual two- or three-dimensional space. The degree of tilting, that is to say the intensity of the input, determines, for example, the speed at which a movement takes place in the virtual space.

Typically, in the case of game controllers, such joysticks are controlled using the thumb, while the rest of the hand holds the game controller. The joysticks are therefore relatively short in order that an actuation range of the input device can be reached with the thumb without a change of grip. Correspondingly, a tilting radius predefined by the lever length is small compared to ergonomically comfortable movement radii, that is to say the joystick tilts away under the finger, wherein the finger cannot naturally follow the movement path of the joystick. In particular, it can occur that the finger has to be overstretched in order to tilt the joystick as far as the edge of its actuation range using said finger. Accordingly, discomfort or even damage to the musculoskeletal system of a user can occur during use.

Other directional input units such as two-dimensional directional sliders likewise have the disadvantage that the rectilinear movement does not correspond to a natural movement, and the user can experience discomfort. Furthermore, from the position of the slider, the user can only draw limited conclusions regarding the degree of input, which, by contrast, in the case of tiltable joysticks, is easily perceptible owing to the degree of tilting.

In computer game applications in particular, it can occur that such input units have to be operated by a user over a relatively long period of time, which increases the possibility of damage to the musculoskeletal system of the user. It is in particular also the case that, with the advent of modern game consoles, computer games have become accessible to a wide audience, with the result that there is a considerable demand for input units which allow ergonomic and comfortable operation.

DESCRIPTION OF THE INVENTION

The problem addressed by the invention is therefore that of providing an input device, belonging to the technical field mentioned in the introduction, for an electronic unit, in particular a game controller, which input device, in a structurally simple manner, allows ergonomic and comfortable actuation or operation by a user.

The solution to the problem is defined by the features of claim 1. According to the invention, an input device, in particular for an electronic unit, preferably for a game controller, comprises an actuation element for the actuation of the input device by a user, having an actuation section accessible from outside the input device, wherein the actuation element can be brought into multiple actuation positions, which define an actuation range, by the user. Here, the actuation element can be displaced into the actuation positions by displacement in one or more displacement directions, which in particular lie substantially in a displacement plane. The input device furthermore comprises electronic position detection means which directly or indirectly detect an instantaneous actuation position of the actuation element. According to the invention, the actuation element is guided, movably in an instantaneous stroke direction that is oriented perpendicular to a respectively instantaneous displacement direction, in the input device, and a control device is provided, by means of which, during a displacement of the actuation element in the actuation range in the one or more displacement directions, a stroke movement of the actuation element in the instantaneous stroke direction is controllable or controlled in a manner dependent on the displacement of the actuation element.

In this way, it is achieved that the actuation element can have different stroke positions in a manner dependent on an instantaneous actuation position, that is to say, when it is displaced into the one or more displacement directions, said actuation element performs a stroke movement in the instantaneous stroke direction. For example, the actuation element may be increasingly lowered into or raised out of the input device with increasing displacement out of a neutral position. Specifically in the case of a configuration as, for example, a joystick, which can be operated using a finger, of a game controller, it can thus be ensured that the finger is not overstretched with increasing displacement of the actuation element, and the provided coupled displaceability and stroke mobility of the actuation element corresponds to a more natural movement of the finger. In particular, according to the invention, during the displacement, the stroke movement can take place away from or toward the finger of the user.

The control device may be configured to be adaptable by a user, such that a stroke profile can be adapted by the user to their personal requirements. In addition to comfortable actuation, it is thus for example possible for joint damage in the case of long-term use to be prevented. Likewise, the stroke movement of the actuation element which is achieved by means of the control device and which is controlled in a manner dependent on the displacement can reinforce or accentuate the subjective perception of the actuation by the user. It is self-evident that, depending on the application, combined stroke profiles with lowering and raising in a manner dependent on the displacement in a displacement direction may also be advantageous.

In the present case, "actuation element" refers to an element which can be mechanically actuated by a user and which can be brought into different displacement positions by means of a change in position in the form of a transverse displacement. The actuation element may for example comprise a displaceable button or a lever (e.g., a joystick). Preferably, the actuation element is of elongate configuration and oriented with a longitudinal axis in the respectively instantaneous stroke direction.

The "actuation section" of the actuation element refers to a region or a structure which is provided for the interaction of the user with the actuating element. The configuration and arrangement of the actuation section preferably specifies a support direction in which contact between the user and the actuation element is provided. For example, the actuation section may comprise a plate-shaped depression for supporting a finger, or a handle for being gripped by the whole hand. In the case of a depression for a finger, the finger is placed on in the support direction predefined by the configuration of the depression; in the case of a handle, a placing-on direction may be predefined by the handle. The support direction preferably corresponds to the respectively instantaneous stroke direction, such that the action of the stroke movement controlled in accordance with the invention is optimally perceptible by the user. The actuation section preferably protrudes outward over the further components of the input device so as to be easily and comfortably accessible to a user over the entire actuation range.

The "actuation range" refers to a range in which the actuation element can be displaced into the one or more actuation positions. The actuation range is thus defined as the range which is formed by all of the possible actuation positions. The one or more displacement directions, which refer to the direction of a transition between two actuation positions, are also predefined by the various actuation positions. It is preferably possible for continuously distributed actuation positions to be assumed in the actuation range, that is to say every position in the actuation range constitutes an actuation position. The actuation range may be a rectilinear range, such that there are only two oppositely directed displacement directions and the actuation element is displaceable in the sense of a linear slider. The actuation range is however preferably areal, such that the actuation element can be displaced in two dimensions. The actuation range may be shaped differently, and for example be of circular, cross-shaped or rectangular shape, depending on the desired application.

The "displacement" of the actuation element refers to a substantially translational movement of the actuation element. The translational movement may be in a transverse displacement direction, which is advantageously transverse with respect to an intended support direction of the hand or of a finger of the user. A substantially translational movement refers to a movement which is primarily translational but which, under some circumstances, may include minor components of a rotational movement. Correspondingly, the displacement of the actuation element in at least one of the one or more displacement directions may follow a slightly curved path, wherein, here, "slightly curved" refers to a minimum radius of curvature which is larger than, preferably at least twice as large as, a maximum dimension of the actuation range in this displacement direction. In this case, the instantaneous displacement directions may protrude slightly out of the displacement plane. The displacement is however preferably a purely translational movement in which all points of the actuation element experience the same displacement, that is to say a parallel displacement, during an actuation.

The "instantaneous displacement direction" refers here to that direction in three-dimensional space in which the actuation element is presently being displaced. The entirety of the possible instantaneous displacement directions preferably lies substantially in the displacement plane, that is to say the instantaneous displacement directions have only slight deviations of preferably less than 15° from the displacement plane. Here, the displacement plane is determined as the plane in which an averaged deviation of all instantaneous displacement directions is minimal. In the case of actuation ranges that are configured symmetrically with respect to the neutral position, the displacement plane is thus generally defined as that plane which is perpendicular to the instantaneous stroke direction when the actuation element is situated in the neutral position. Preferably, however, the entirety of all instantaneous displacement directions lies strictly in the displacement plane.

The "electronic position detection means" may comprise any type of known detection means which are suitable for detecting an actuation position of the actuation element and converting it into electronic signals. The electronic signals can then be processed by an internal or external evaluation unit. Known such detection means are based, for example, on optical, electrical, magnetic and/or electrostatic detection principles and include, for example, sensors which are arranged in the input device and which detect reference markers arranged on the actuation element, or sensors which are attached to the actuation element and which detect reference markers arranged in the input device. Numerous suitable detection means are known to the person skilled in the art and reference is made to the relevant literature.

According to the invention, the "instantaneous stroke direction" is arranged perpendicular to the respectively instantaneous displacement direction. Owing to the movable mounting, the actuation element can perform a stroke movement in the instantaneous stroke direction. The actuation element may be guided, linearly movably in an instantaneous stroke direction that is oriented perpendicular to a respectively instantaneous displacement direction, in the input device. The actuation element may be mounted, rectilinearly movably in a linear guide, on a further component of the input device, wherein the guide direction of the linear guide points in each case in the direction of the instantaneous stroke direction. In this case, the stroke movement is a purely translational movement. The stroke movement can take place in the two opposite directions along the instantaneous stroke direction. The instantaneous stroke directions are preferably substantially perpendicular to the displacement plane, that is to say they have a deviation of no more than approximately 15 degrees from a perpendicular orientation. The actuation element is preferably guided movably in exactly one instantaneous stroke direction in every actuation position in the actuation range.

A stroke profile refers to a path that a point of the actuation element moves along in the case of a superposed stroke movement and displacement. The stroke profile of a point of the actuation element is thus, according to the invention, determined by the control device, which controls the stroke movement during a displacement in the one or more displacement directions.

As mentioned, in a particularly preferred embodiment, all instantaneous displacement directions lie strictly in the displacement plane. The instantaneous stroke directions are thus perpendicular to the displacement plane, and are oriented along a common stroke direction, in every actuation position of the actuation element. In other words, this means that the instantaneous stroke directions are oriented parallel to one another in every actuation position. In this case, the actuation element performs a purely translational movement during the displacement, which is generally easier to implement in terms of design. In this case, the possible overall movement of the actuation element is composed of a superposition of a purely translational displacement in the displacement plane and a purely translational stroke movement in the common stroke direction. Alternatively, as mentioned, the instantaneous displacement directions may deviate slightly from the displacement plane, that is to say protrude out of the latter, if the displacement follows a slightly curved path, for example. In this case, the one or more instantaneous displacement directions are regarded as substantially lying in the displacement plane if a deviation from the displacement plane does not exceed 15°.

In a preferred embodiment, the actuation element is mounted in the input device, so as to be guided displaceably in the one or more displacement directions and movably in the respectively instantaneous stroke direction, by means of a guide device. The guide device may for example comprise a guide plate which is mounted displaceably on the input device and on which, in turn, the actuation element is mounted so as to be guided movably in the instantaneous stroke direction. In this case, during a displacement of the actuation element in the one or more displacement directions, the guide plate is displaced together with said actuation element. Furthermore, the guide device may also form a functional part of the control device, that is to say the control device performs a control function for the stroke movement and a guidance function for the actuation element. The control device may, for example, be configured as a table with a bidirectional parallelogram guide, on the table top of which the actuation element is arranged, or the table top of which forms the actuation element. Owing to the bidirectional parallelogram guidance, the table top can be displaced transversely in two dimensions without rotation, and in the process performs a superposed stroke movement in the respectively instantaneous stroke direction.

Alternatively, and likewise preferably depending on requirements, the actuation element may be mounted in the input device, displaceably in the one or more displacement directions and movably in the respectively instantaneous stroke direction, by means of an elastic element. In this case, the actuation element is for example mounted, so as to be guided movably in the instantaneous stroke direction, directly on the elastic element, whilst the elastic element may be fixedly connected to the input device. The translational displaceability of the actuation element may in this case be achieved by way of the elasticity of the elastic element.

In a further preferred embodiment, one of the actuation positions forms a neutral position, in which the actuation element is arranged in the absence of actuation. The neutral position forms a distinct actuation position in the actuation range. The input device preferably comprises a resetting device, such as one or more resiliently elastic elements, which resets the actuation element into the neutral position in the absence of actuation.

The actuation range is preferably circular. In this way, proceeding from the center of the circle, the actuation element can be displaced in the displacement plane to the same extent in all displacement directions. This is particularly suitable for applications in which the actuation element is used in the sense of a joystick for directional inputs on a two-dimensional representation on a display, as is often the case, for example, with gamepads or navigation devices. Preferably, the neutral position is optionally arranged in the center of the circular actuation range. Other configurations of the actuation range that may likewise be preferred depending on the application may be elliptical, cross-shaped, star-shaped or rectangular, in particular square, and rectilinear or serpentine actuation ranges are also conceivable in the case of one-dimensional displaceability.

In a preferred embodiment of the invention, the control device is configured such that the actuation element is at least partially lowerable or lowered into the input device in the respectively instantaneous stroke direction when said actuation element is displaced in the one or more displacement directions. This is advantageous in particular when the actuation element is displaced out of the neutral position. In this case, the actuation element performs a stroke movement which is directed into the input device, wherein the actuation section of the actuation element falls toward the input direction. The stroke of the actuation element thus decreases with the displacement out of the neutral position. The stroke preferably decreases progressively with increasing displacement out of the neutral position.

In a preferred embodiment, the control device is configured, and interacts with the actuation element, such that positive control of the stroke movement in a manner dependent on the displacement of the actuation element in the one or more displacement directions is implemented. Positive control has the advantage that a stroke of the actuation element is positively specified, and thus a position of the actuation element is uniquely determined, in every actuation position. Positive control can be achieved, for example, by virtue of the control device comprising a control motion link on which the actuation element is guided in a positively controlled manner.

In a particularly preferred embodiment, the control device comprises a control element with a control surface and the actuation element has a control section for interaction with the control surface. Here, the control surface is configured, and arranged with respect to the actuation element, such that, during the displacement of the actuation element in the one or more displacement directions, the stroke movement of the actuation element in the instantaneous stroke direction is controllable or controlled by interaction of the control section with the control surface. The configuration of the control device comprising a control element with a control surface offers a particularly simple design solution for controlling the stroke movement according to the invention of the actuation element. Here, the control section of the actuation element passes over the control surface during the displacement of the actuation element, wherein a control profile of the control surface is traced. In the case of a rigid actuation element, the control profile of the control surface thus results directly in the stroke profile of the actuation element during a displacement. Here, the control section may for example have a sliding surface and slide therewith on the control surface, or may comprise a rolling body, such as a ball, which is mounted on the actuation element and which rolls on the control surface.

The control section advantageously protrudes into the input device in the respectively instantaneous stroke direction, and the control section is arranged in the input device opposite the control surface in the respectively instantaneous stroke direction. As viewed in the stroke direction, the actuation element and the control surface are thus arranged one behind the other from the outside to the inside. The control surface preferably extends with its main extent substantially perpendicular to the respectively instantaneous stroke direction, that is to say substantially parallel to the actuation range or the displacement plane, whilst the control profile of the control surface varies in the stroke direction. Correspondingly, the control section is preferably formed on the actuation element opposite the actuation section.

In principle, the control surface may alternatively also be arranged so as to be laterally offset in relation to the actuation element with respect to the respectively instantaneous stroke direction, wherein the control section of the actuation element may in this case for example extend toward the control surface transversely with respect to the instantaneous stroke direction.

The control section of the actuation element preferably lies against the control surface in every actuation position. It is alternatively also conceivable that the control section interacts with the control surface only in certain regions of the actuation range, and is lifted off from the control surface in other regions, such that no stroke movement of the actuation element occurs during a displacement in these regions.

A preloading device is preferably provided, by means of which the actuation element is preloadable or preloaded in the respectively instantaneous stroke direction against the control surface such that the control section is pressed against the control surface. The preloading device may for example be configured as a compression spring or resiliently elastic sleeve, which is for example supported on the guide device and acts on the actuation element, via a stop formed thereon, with a spring force in the direction of the control surface. There are self-evidently also numerous further possibilities for the configuration and arrangement of a suitable preloading device.

According to a further advantageous embodiment, a magnetic coupling is provided between the actuation element and the control surface, such that the control section is pressed against the control surface. This is realized in particular such that the control section is pressed against the control surface in every actuation position. The magnetic coupling may be provided as an alternative or in addition to the preloading device.

The magnetic coupling is preferably generated through the combination of an electromagnet with a ferromagnetic material. An electromagnet has the advantage that the magnetic force can be adjusted. The ferromagnetic material may for example be iron, cobalt and/or nickel.

The magnetic coupling comprises in particular a magnet, which is provided on the control section, and a control surface, which comprises or is composed of a ferromagnetic material, or the magnetic coupling comprises a control section, which comprises or is composed of a ferromagnetic material, and a magnet, which is provided in the region of the control surface. Here, the magnet may be a permanent magnet and/or an electromagnet.

In a further possible embodiment, the magnetic coupling is realized by means of two permanent magnets, wherein, in particular, the first permanent magnet is arranged on the control section, whilst the second permanent magnet is arranged in the region of the control surface. In principle, however, other arrangements are also possible in order to realize a magnetic coupling.

In order to provide the user with additional feedback via the actuation element, the control surface may have one or more surface-structured regions by means of which, when said control surface is passed over with the control section, haptic feedback can be generated for the user at the actuation section. Here, the surface-structured regions may for example indicate a stop at a delimitation of the actuation range in the event of further displacement. The surface-structured regions may however also indicate a change in the operating mode of the input device dependent on the displacement of the actuation element, or for example a change in a game mode, such as a transition from "walking" to "running", in the case of sufficient displacement out of the neutral position.

It is also preferred if the control surface has a limiter which prevents a displacement of the actuation element beyond this. In particular, the limiter is designed so as to form a stop for the control section of the actuation element.

In particular, the limiter is a projection which protrudes in the stroke direction in an edge region of the control surface, in particular a projection which encircles the control surface and which protrudes in the stroke direction in the edge region of the control surface.

The control surface preferably has, instead or in addition, a recess at one or more points, in particular optionally at a point which corresponds to the neutral position of the actuation element, which recess defines a temporary rest position for the control section. Here, the recess is preferably adapted to the configuration of the control section of the actuation element, such that said control section can be introduced into the recess and remains there in the temporary rest position. The recess may be configured such that the actuation element remains in the rest position counter to any resetting force into the neutral position that may be present. In the case of the preloading device, which preloads the actuation element against the control surface in the respectively instantaneous stroke direction, the actuation element is additionally pressed into the recess.

In an embodiment that is preferred depending on the application, the control element comprises a control motion link on which the control surface is formed, wherein the control section interacts with the control motion link such that positive control of the stroke movement in a manner dependent on the displacement of the actuation element in the one or more displacement directions is implemented. Positive control by means of a control motion link has the advantage that a stroke of the actuation element is positively predefined in every actuation position. In particular, in this case, the actuation element cannot be lifted off from the control surface.

In a preferred embodiment, the control surface is, at least in certain regions, with respect to at least one of the one or more displacement directions, configured so as to be curved in the respectively instantaneous stroke direction, toward or away from the latter. In other words, this means that the control surface, in a section with an imaginary plane which is perpendicular to the displacement plane and in which the at least one of the one or more displacement directions lies, has a control profile with a curvature. Here, the control surface may for example be configured as a partial cylinder surface or as a dome. It is self-evident that control profiles with any complex curvature are also conceivable. In a preferred embodiment, the control surface is configured so as to be curved and rotationally symmetrical with respect to a perpendicular imaginary axis oriented perpendicular to the displacement plane. This is advantageous in particular in embodiments in which the actuation range is circular. Here, the curvature may be convex and/or concave depending on the desired control profile. Alternatively, the control surface has only rectilinear or planar sections which meet at edges, such that there are no curved sections in the control profile.

The control surface is preferably configured so as to be curved substantially in the manner of a dome, in particular as a spherical dome, so as to be convexly arched toward the actuation element. Here, the control profile of the curved control surface preferably has a maximum at a point which corresponds to the position of the control section in the neutral position of the actuation element. Here, a maximum refers to a region which in the common stroke direction, extends the furthest toward the displacement plane and which is surrounded only by regions which are at a greater distance from the displacement plane. In case of a control surface configured as a spherical dome, the control section is arranged in a pole region of the control surface when the actuation element is situated in the neutral position. Here, the pole region forms such a maximum. At the maximum, the actuation element has the greatest stroke, that is to say protrudes outward to the greatest extent. It is however self-evident that a local recess as described above may be provided at the maximum for a rest position.

In a preferred embodiment, the actuation element is configured in the form of an elongate lever, wherein a longitudinal axis of the lever is oriented in the respectively instantaneous stroke direction in every actuation position. Here, the elongate lever may form an actuation element referred to generally as a joystick. However, the lever may for example also be configured as a one-dimensionally displaceable lever in the sense of an acceleration lever, or analogously to a gearshift arrangement with a displacement gate. Here, in particular, the actuation section is formed at a first longitudinal end of the actuation element and the control section is formed at a second longitudinal end situated opposite the actuation section in the stroke direction.

In a further preferred embodiment, the control element is arranged so as to be deflectable, resiliently, in the input device in such a way that, when a force acts on the actuation element in the respectively instantaneous stroke direction, the control element is deflectable by means of the control section. This has the advantage that the control element can serve to actuate a switch or a button by being deflected onto the actuation element in the instantaneous stroke direction by means of an actuation pressure. Here, a corresponding switch or button is preferably arranged on that side of the control element which is situated opposite the actuation element.

The control element may advantageously be arranged in the input device such that it can be adjusted by a user. In this way, the stroke profile can be adapted to the requirements of a user by adjustment of the position of the control element with respect to the actuation element. Likewise, the input device can be mechanically calibrated in this way, if necessary.

In a further advantageous embodiment, the control element is arranged in the input device such that it can be exchanged by a user, such that different control elements with different control surfaces can be inserted into the input device. In this way, it is possible to implement different stroke profiles with the same input device. A user can thus easily adapt the input device to their requirements by exchanging the control element. In the input device, there may be fastening means, such as latching means, to which the control element can be fastened by a user. Here, the fastening means of the input device and the fastening means of the control element are preferably configured to be complementary, such that easy mutual fastening is possible.

The invention thus also comprises a control element for an input device, in which the control element is arranged to be exchangeable. Here, the control element is configured as a separate, exchangeable part and has a control surface, in particular a curved control surface, for the abutment of the control section of the actuation element of the input device. Here, the control element preferably comprises fastening means by way of which the control element can be fastened, by the user, to fastening means of the input device. The fastening means of the control element may comprise latching means by way of which the control element can be latched to the latching means of the input device. Here, the fastening means of the control element are preferably configured to be complementary to corresponding fastening means of the input device. Preferably, the control element can for example be inserted into a holding bay of the input device and latched there. The input device may, for example, have, in the holding bay, an insertion guide, and the control element may have, for example, guide strips which can be guided in the insertion guide and by means of which said control element can be inserted into the insertion guide. Here, the fastening means may be formed in the holding bay, in particular in the insertion guide, such that the corresponding fastening means of the control element automatically interact, so as to fasten the control element, during the insertion movement.

The invention furthermore relates to an electronic unit, in particular a mobile electronic unit, having an input device according to the invention. The electronic unit is preferably a game controller. The input device according to the invention may however also be used advantageously for other electronic units which in particular require two-dimensional input for a representation on a screen, for example for a mobile phone, a static or mobile navigation unit or a portable game console. Use in an electronic unit for installation in a vehicle, in particular in an automobile, for example a built-in navigation unit, is also particularly advantageous. Here, "vehicles" encompasses any type of vehicles, such as land vehicles, aircraft or watercraft. The input device according to the invention may advantageously also be used as an operating element on a steering wheel or a center console.

The invention furthermore also comprises a parts set comprising an input device according to the invention, in which the control element is arranged so as to be exchangeable, or an electronic unit comprising such an input device, and also at least one additional control element for such an input device. Here, the additional control element may serve as a replacement part or may have a different control surface than the control element of the input device, such that a user can individually adapt a stroke movement of the actuation element of the input device to their requirements. It is self-evident that the parts set may also comprise more than just one additional control element, preferably each with differently configured control surfaces.

Further advantageous embodiments and combinations of features of the invention will emerge from the following detailed description and from the patent claims in their entirety.

BRIEF DESCRIPTION OF THE DRAWINGS

The drawings used for explanation of the exemplary embodiment schematically show:

FIG. 6*a* a plan view, in the stroke direction, of an input device for two-dimensional directional input, the cross section of which input device corresponds to the cross-sectional view of FIG. 2;

FIG. 6*b* a plan view, in the stroke direction, of an input device for one-dimensional directional input, the cross section of which input device corresponds to the cross-sectional view of FIG. 2;

FIGS. 7*a*-7*d* plan views of different outlines of possible actuation ranges of an input device according to the invention;

FIGS. 8*a*-8*f* various exemplary cross-sectional profiles for the configuration of a control surface of a control element of an input device according to the invention;

FIG. 9 an oblique view of an exchangeable control element of an input device according to the invention as illustrated in FIG. 3;

FIG. 10 a further embodiment of an input device according to the invention, in the case of which a control device has four rod-shaped supports, FIG. 11 a further embodiment of an input device according to the invention, in the case of which a control device has three rod-shaped supports, FIG. 12 a further embodiment of an input device according to the invention, in the case of which the control device has a single rod-shaped support, FIG. 13 a further embodiment of an input device according to the invention, which is similar to the input device shown in FIG. 1 but has a different type of control device, and FIG. 14 an illustration of an actuation element that can be used in an input device according to the invention.

In principle, the same parts are denoted by the same reference designations in the figures.

WAYS OF IMPLEMENTING THE INVENTION

Figure 1:
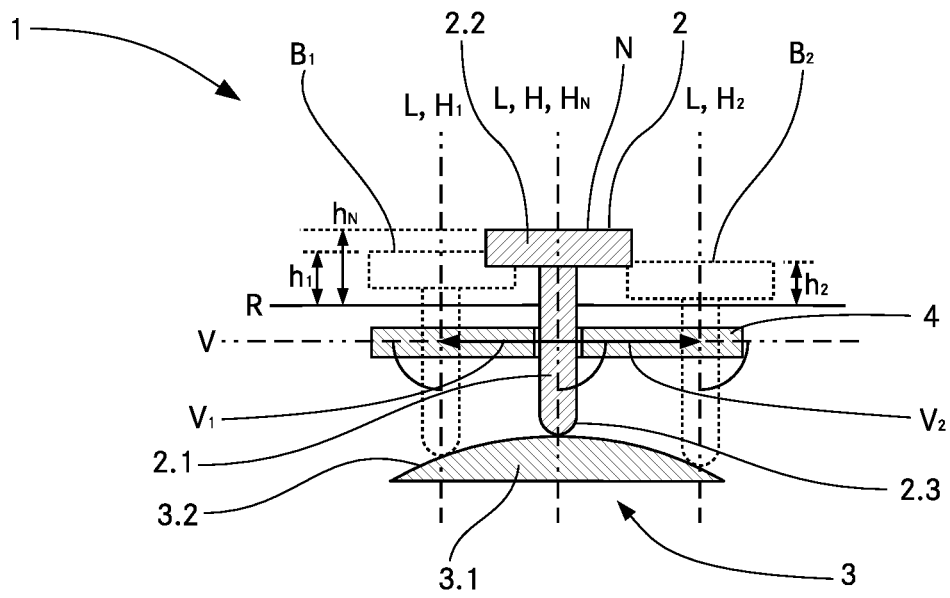
FIG. 1 a cross-sectional view through an input device according to the invention having a control device comprising a control element.

FIG. 1 shows a schematic cross-sectional view of an input device 1 according to the invention.

In this embodiment, an actuation element 2 has a rod-shaped main body 2.1. A longitudinal axis L of the actuation element 2 is defined by the longitudinal axis of the main body 2.1. Provided at an externally accessible longitudinal end of the main body 2.1 is an actuation section 2.2, which in the present case is configured as a plate-shaped support for a finger of a user. At an opposite longitudinal end of the main body 2.1 in the longitudinal direction L, which longitudinal end protrudes into the input device 1, there is formed a control section 2.3. In the present embodiment, the control section 2.3 is configured as a dome-shaped rounding of the main body 2.1, though may alternatively also comprise, for example, one or more rolling bodies, such as a ball, rotatably mounted on the main body 2.1.

Figure 2:
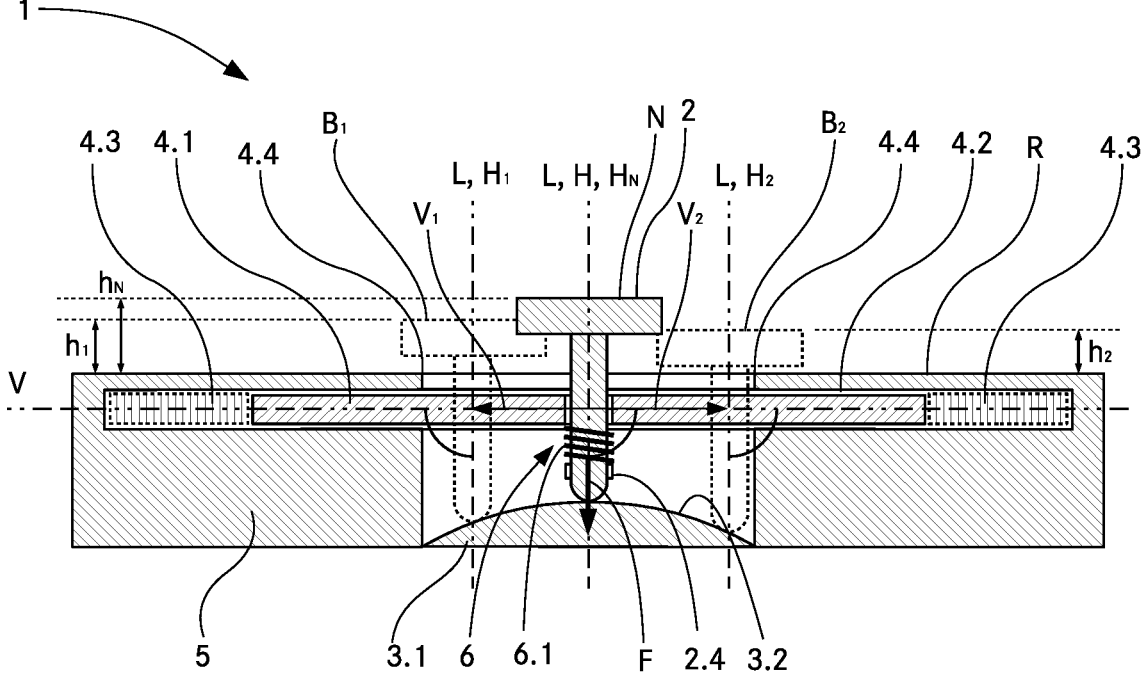
FIG. 2 a cross-sectional view of a further embodiment of an input device according to the invention having a guide device comprising a guide plate.
Figure 3:
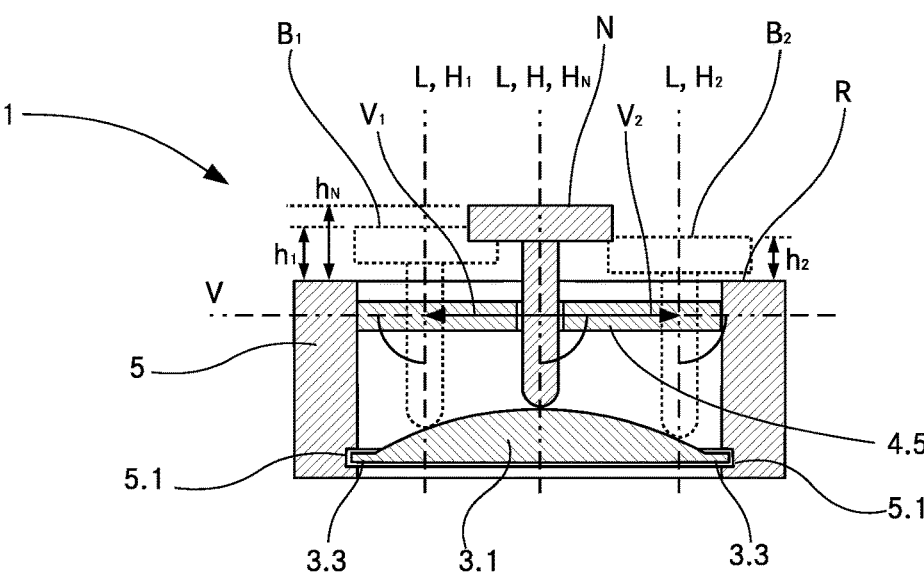
FIG. 3 a cross-sectional view of a further embodiment of an input device according to the invention having a guide device comprising an elastic guide element, wherein an exchangeable control element is provided.

The actuation element 2 is arranged in the input device 1, so as to be displaceable in parallel, in a displacement plane V perpendicular to the longitudinal axis L, into one or more actuation positions $B_1$ and $B_2$ (dashed lines), by means of a guide device 4 not described in any more detail here (in this regard, see for example FIGS. 2 and 3). Here, the actuation element 2 is mounted, movably in the direction of the longitudinal axis L, on the guide device 4, such that the actuation element 2, in the neutral position N and in each of the actuation positions $B_1$ and $B_2$, can perform a stroke movement in a stroke direction $H_N$ or $H_1$ and $H_2$, which are each oriented along the longitudinal axis L. The stroke directions $H_N$, $H_1$ and $H_2$ are oriented parallel and along a common stroke direction H, which is perpendicular to the displacement plane V.

In the illustration of FIG. 1, the actuation element 2 is situated in a neutral position N, which is shown by solid lines. In the neutral position N, the actuation element 2 has a stroke of $h_N$ with respect to a reference plane R which is parallel to the displacement plane V. The reference plane R may for example be defined by an outer side of the input device 1, over which the actuation element 2, in the neutral position, protrudes outward by the stroke $h_N$.

The actuation element 2 lies with the control section 2.3 against a control surface 3.2 of a control element 3.1 of a control device 3 of the input device 1. The control element 3.1 is arranged within the input device 1 opposite the actuation element 2 in the longitudinal direction L thereof. The control surface 3.2 faces toward the actuation element 2. The control surface 3.2 has a curved profile which, with respect to the reference plane R, is convexly arched toward the latter. In the embodiment of FIG. 1, the control surface 3.2 is configured as a spherical dome. The control surface 3.2 may however also have other profiles (see for example FIGS. 8*a*-8*f*).

The control section 2.3 of the actuation element 2 is, in the neutral position arranged, at a pole of the spherical-dome-shaped control surface 3.2. The control surface 3.2 thus has a maximum at a position of the control section 2.3 which corresponds to the neutral position N, at which maximum the control surface 3.2 extends to the greatest extent in the direction of the stroke direction H or of the longitudinal axis L of the main body 2.1 in the direction of the reference plane R, that is to say also in the direction of an outside space.

The actuation element 2 can be displaced out of the neutral position N into the actuation positions $B_1$ and $B_2$ by displacement in a displacement direction $V_1$ or $V_2$, which lies in the displacement plane V, respectively. The displacement directions $V_1$ and $V_2$ are directed oppositely to one another in the illustration of FIG. 1. During the displacement in the displacement directions $V_1$ and $V_2$, the actuation element 2 is, in every position, displaced in an instantaneous displacement direction. In this embodiment, the instantaneous displacement directions all lie strictly in the displacement plane V, whereby it is also the case that instantaneous stroke directions, defined by the mobility of the actuation element 2 in every position along its longitudinal axis L, are perpendicular to the respectively instantaneous displacement direction.

During a displacement in one of the displacement directions $V_1$ or $V_2$, the actuation element 2 slides with the control section 2.3 on the control surface 3.2. Owing to the convex curvature of the control surface 3.2, the actuation element 2 is thus, during the displacement out of the neutral position N in the displacement direction $V_1$ or $V_2$, lowered in the stroke direction H into the input device 1. In order that the control section 2.3 remains in contact with the control surface, it may for example be necessary for a force to be applied by the user to the actuating element 2 in the direction of L, or a preloading device 6 may be provided which acts on the actuation element 2 with a spring force F in the direction of L toward the control surface (see for example FIG. 2).

Owing to the stroke movement of the actuation element 2 controlled in this way by means of the control surface 3.2, said actuation element has a stroke $h_1$ in the actuation position $B_1$ and a stroke $h_2$ in the actuation position $B_2$. In the embodiment of FIG. 1, the strokes $h_1$ and $h_2$ are each smaller than the stroke $h_N$ in the neutral position N. Accordingly, during a displacement in the displacement directions $V_1$ and $V_2$, the actuation element 2 is lowered into the input device 1, such that the actuation section 2.2 of the actuation element 2 performs a stroke movement which follows the profile of the control surface 3.2.

It is self-evident that the aforementioned components of the input device 1 interact, for example, with a base structure 5 which is not illustrated in FIG. 1 for the sake of better clarity (see for example FIG. 2) of the input device 1, for example are formed on or fastened to said base structure. The input device 1 may also comprise a housing which at least partially delimits the input device to the outside and which, in embodiments that are preferred depending on requirements, may simultaneously form the base structure 5. It is likewise self-evident that the actuation positions $B_N$, $B_1$ and $B_2$ are of an exemplary nature, and, unless otherwise stated, the actuation element can in each case assume a multiplicity of, for example, continuously distributed actuation positions.

FIG. 2 shows a further embodiment of the input device 1 according to the invention, in the case of which the guide device 4 is configured as a guide plate 4.1, which is guided, displaceably in the displacement plane V, in corresponding guide slots or rails 4.2 of a base structure 5 of the input device 1. The guide slots 4.2 may in this case be configured such that the guide plate 4.1 is mounted on the base structure 5 so as to be guided displaceably in 2 dimensions. Likewise, the guide slots 4.2 may be configured such that only one-dimensional displaceability is possible (in this regard, see for example also FIGS. 6a and 6b).

In the guide slots 4.2, resiliently elastic elements 4.3 may for example be arranged on the base structure 5, which resiliently elastic elements exert a resetting force on the guide plate 4.1 such that, when no external forces are acting, said guide plate is returned into a position which corresponds to the neutral position N of the actuation element. Furthermore, the guide device 4 may comprise a stop or stops 4.4, which limit a displaceability of the actuation element 2 and thus define an actuation range A (see for example FIGS. 7a to 7d). In the present embodiment, the stops 4.4 are formed on the base structure 5, though may also be provided by separate components or be formed on a housing.

The embodiment of FIG. 2 furthermore comprises a preloading device 6 by means of which the actuation element 2 is preloaded in its longitudinal direction L against the control surface 3.2, such that a uniform abutment of the control section 2.3 against the control surface 3.2 is ensured. The preloading device 6 comprises a spring element, in the present case a helical spring 6.1 which acts under compression and which is mounted, for example, onto the rod-shaped main body 2.1 of the actuation element 2. The helical spring 6.1 is arranged between the guide plate 4.1 and the control section 2.3 and is supported toward the control surface 3.2 on a projection 2.4 formed on the actuation element 2. In the opposite direction, the helical spring 6.1 is supported on the guide plate 4.1. With suitable preloading of the helical spring, it can be achieved in this way that, in every actuation position, such as $B_N$, $B_1$ or $B_2$, the actuation element 2 is pressed with its control section 2.3 with a pressing force F against the control surface 3.2. Here, F may vary in magnitude in a manner dependent on the actuation position, but is always oriented in the direction of the longitudinal direction L and thus in the stroke direction H or, for example, $H_N$, $H_1$ or $H_2$.

FIG. 3 schematically shows a further possible embodiment of the input device 1, in which the guide device 4 comprises an elastic guide element 4.5 instead of a guide plate 4.1 guided on the base structure 5. The guide element 4.5 is supported on the base structure 5, and for example fastened thereto, in the direction of the displacement directions $V_1$ and $V_2$, that is to say in directions of the displacement plane V. The guide element 4.5 is elastically extensible and compressible in the direction of the displacement plane, such that said guide element is compressed during a displacement of the actuation element 2 in the displacement direction, and is extended in the opposite direction. Since the guide element 4.5 is elastic, a resetting force is automatically applied which resets the actuation element 2 into the neutral position N in the absence of external forces. Here, the actuation element 2 is mounted, so as to be guided movably in its longitudinal direction L, on the guide element 4.5.

The control element of the embodiment of FIG. 3 is arranged exchangeably in the input device 1. For this purpose, the control element has lateral guide strips 3.3 which engage displaceably in guide rails 5.1 formed on the base structure 5. The control element 3.1 can thus be pulled out of or pushed into the base structure 5 in the direction of the guide rails 5.1. The guide rails 5.1 and the guide strips 3.3 preferably have in each case complementary latching means (see for example FIG. 9), such that the control element 3.1 latches in a desired position during the insertion movement.

Figure 4:
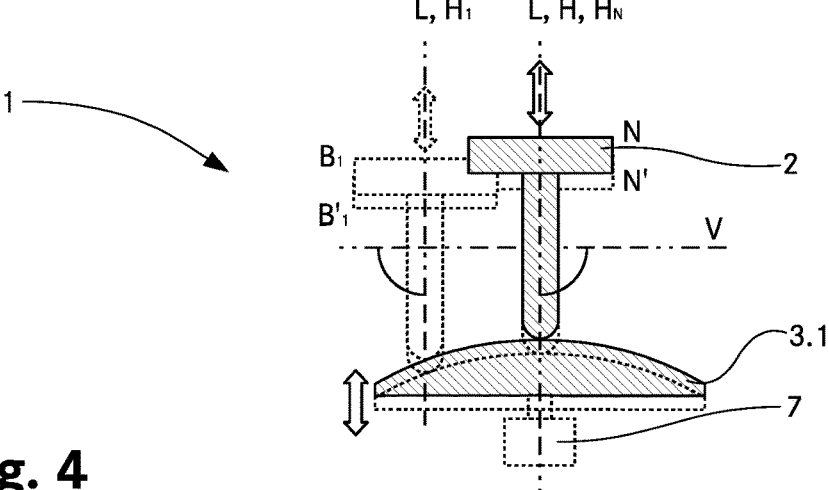
FIG. 4 a cross-sectional view of a further embodiment of an input device according to the invention, in which the control element is arranged so as to be deflectable in a stroke direction.

FIG. 4 schematically shows a further possible embodiment of the input device 1, in which the control element 3.1 is arranged in the input device so as to be deflectable in the stroke direction H. Here, the control element 3.1 can be deflected by means of the actuation element 2 in a direction corresponding to the stroke direction H, for example counter to a resetting force. In this way, the actuation element 2 can, in the neutral position or in an actuation position such as $B_1$, be pushed in the manner of a pushbutton in the input direction into the neutral position N' or actuation position $B_1'$. Here, the control element 3.1 is deflected by means of the control section 2.3. Here, the control element 3.1 may have a resiliently elastic resistance in the manner of pushbuttons, counter to which the deflection takes place. The resiliently elastic resistance may be imparted for example by a resetting device with an elastic element (not shown). Furthermore, for example in the manner of known pushbuttons, a threshold value of the pressure force to be applied may have to be overcome in order to effect the deflection.

The control element 3.1 may for example be connected to an electronic switching element 7, which is actuated in the manner of a pushbutton (indicated by dashed lines) during deflection of the control element 3.1. In this way, the actuation element 2 can also be used as a pushbutton in addition to the displacement in the displacement plane V.

Since the entire control element 3.1 is arranged so as to be deflectable, the deflection can be effected in a simple manner in the neutral position N and in every actuation position $B_1$ or $B_2$ of the actuation element 2, wherein only one switching element 7 coupled to the control element is required. For the sake of better clarity, further components of the input device are not illustrated in FIG. 4.

Figure 5:
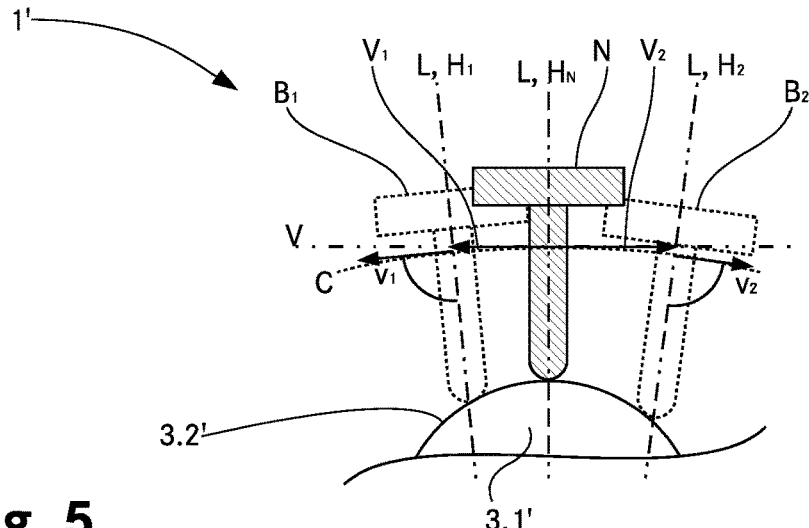
FIG. 5 a cross-sectional view of a further embodiment of an input device according to the invention, in the case of which an actuation element is displaceable on a slightly curved path.

FIG. 5 shows a further embodiment of an input device 1' according to the invention. By contrast to the input device 1, an actuation element 2' is arranged so as to only be displaceable substantially in a displacement plane V, that is to say an actual displacement path C may deviate slightly from the displacement plane V. By contrast to this, in the case of the input device 1, the displacement path C lies entirely in the displacement plane V. Here, a slight deviation is to be understood to mean a deviation of an instantaneous displacement direction $v_1$ or $v_2$ from the displacement plane V which does not exceed 15°. By contrast to the displacement directions $V_1$ and $V_2$, which refer to the direction of a displacement for the transition to an actuation position in the displacement plane V, instantaneous displacement directions $v_1$ and $v_2$ refer to the respective directions in which the actuation element 2' is presently being displaced (illustrated here by way of example as $v_1$ and $v_2$ on the basis of the instantaneous actuation positions $B_1$ and $B_2$). According to the invention, the instantaneous stroke directions such as $H_N$, $H_1$ or $H_2$ are always perpendicular to the instantaneous displacement direction $v_1$ and $v_2$.

The displacement plane V of the input device 1' is perpendicular to the stroke direction $H_N$ of the neutral position N. The displacement path C or, in the two-dimensional case, the displacement surface C follows a slightly curved path, such that the instantaneous displacement directions, for example the instantaneous displacement directions $v_1$ and $v_2$ in the exemplary actuation positions $B_1$ and $B_2$, are at a non-zero angle with respect to the displacement plane V. The displacement directions are however arranged substantially in the displacement plane V, which in the present case is to be understood to mean that an angle enclosed by an instantaneous displacement direction with the displacement plane V does not exceed 15°. During the displacement out of the neutral position N into one of the exemplary actuation positions $B_1$ or $B_2$, the instantaneous displacement direction changes continuously owing to the curved displacement path C.

In this case, for example, the displacement path or surface C can be used as a reference for the determination of a stroke of the actuation element 2'. Here, the control surface 3.2' of the control element 3.1' is configured such that the actuation element 2', when deflected out of the neutral position N, is lowered into the input device 1'. In other words, a stroke h of the actuation element decreases with increasing displacement. In order to achieve this, a distance between the control surface 3.2' and the displacement path or surface C increases with increasing distance from a position corresponding to the neutral position N. In this case, too, the control surface 3.2' may be configured as a spherical dome, wherein the position corresponding to the neutral position N is arranged at the pole of the spherical dome.

FIG. 6a shows a schematic plan view, in the stroke direction H, of the input device 1 for two-dimensional directional input, having a cross section which corresponds to the cross-sectional view of FIG. 2. In particular, FIG. 6a illustrates the components of the guide device 4. Here, the actuation range A is circular, wherein the actuation range A is bordered and delimited, for example, by the stop 4.4 of the base structure 5. Accordingly, the actuation element 2 can be displaced until it abuts against the stop 4.4. The actuation range A is two-dimensional in the sense that the exemplary displacement directions $V_1$, $V_2$, and $V_3$ lying in the displacement plane V may be skewed with respect to one another.

Formed in the base structure 5 (not illustrated) is the guide slot 4.2, which extends in a circular ring around the actuation range A. The guide plate 4.1 is configured as a circular disk 4.6 and, in every possible displacement position, overlaps the entire actuation range A, such that said actuation range is completely closed off by the guide plate 4.1 in every state. In this way, the circular disk 4.6 can for example prevent dirt or dust from ingressing into an interior space of the input device 1.

In FIG. 6a, the exemplary actuation positions $B_1$, $B_2$ and $B_3$ are shown by dashed lines, and the neutral position N is shown by solid lines. Here, the circular-ring-shaped guide slot 4.2 is dimensioned such that the guide plate 4.1, which is displaced together with the actuation element 2, can be displaced until the actuation element 2 abuts against the stop 4.4. This is the case for example in the exemplary actuation positions $B_2$ and $B_3$ (for $B_2$, see for example also FIG. 2). Here, the displacement directions $V_1$, $V_2$ and $V_3$ associated with the actuation positions $B_1$, $B_2$ and $B_3$ lie in the displacement plane V.

FIG. 6b shows a schematic plan view, in the stroke direction H, of the input device 1 for one-dimensional directional input. The plan view of FIG. 6b has the same cross-sectional view, of FIG. 2, as the embodiment of FIG. 6a. However, by contrast to the circular disk 4.6 of FIG. 6a, in the case of FIG. 6b the guide plate 4.1 is configured as an elongate strip 4.7. In this case, the actuation range A corresponds to an elongate slot 4.8, in which the actuation element 2 is displaceable out of the neutral position N in only two mutually opposite directions. Here, the stops 4.4 are formed by the delimitations at the longitudinal ends of the slot 4.8. In the case of the illustration in FIG. 6b, the guide slot 4.2 in the base structure 5 is configured for example as an elongate rail, in which the elongate strip 4.7 is mounted so as to be guided displaceably in the respective displacement direction. The strip 4.7, which is moved together with the actuation element 2, is in this case dimensioned so as to fully overlap the slot 4.8 in every actuation position of the actuation element 2.

FIGS. 7a-7d schematically show different configurations of the actuation range A, which is defined by the set of possible actuation positions into which the actuation element 2 can be displaced. The actuation range A may be delimited in each case by stops 4.4 which, for example, delimit the entire outline of the actuation range A or else limit the displaceability of the actuation element 2 only in one of the respective displacement directions $V_x$.

FIG. 7a shows a one-dimensional actuation range A, in which the displacement directions $V_x$ lie on a straight line, that is to say the actuation element 2 can only move out of the neutral position N in a first and in a second displacement direction $V_x$, which second displacement direction is opposite to the first. The possible actuation positions may be distributed continuously in the direction of the displacement directions $V_x$ in the actuation range, or may also constitute discrete positions. The actuation range A of FIG. 7a corresponds substantially to the actuation range A in the illustration in FIG. 6b.

FIG. 7b shows a two-dimensional actuation range A, in which the actuation element 2 can be displaced out of the neutral position N in two mutually perpendicular directions $V_x$. The actuation range A thus has a cross-shaped outline. FIG. 7c shows a further two-dimensional actuation range, which is circular. Here, the actuation element 2 can be displaced out of the neutral position N, which is arranged in the center of the circular actuation range, in a multiplicity of displacement directions $V_x$, to an equal maximum extent in every direction. Here, each point of the actuation range A may constitute an actuation position. The actuation range A of FIG. 7c corresponds substantially to the actuation range A in FIG. 6a. FIG. 7d shows an actuation range A of square configuration. Analogously to the circular actuation range A of FIG. 7c, the actuation element 2 can be displaced out of the centrally arranged neutral position N in a multiplicity of displacement directions $V_x$. However, the actuation element 2 can be displaced further toward the corners of the outline than toward the sides.

FIGS. 8a to 8f show various exemplary cross-sectional profiles for the configuration of the control surface 3.2 of the control element 3.1. The illustrated profiles may each serve for the control of a one-dimensional displacement of the actuation element 2, or may for example be understood to be rotationally symmetrical with respect to the stroke direction H in a centrally arranged neutral position N. The profiles extend over a dimension D, which corresponds to a maximum dimension of the actuation range A in the corresponding displacement direction in the displacement plane V.

FIG. 8a shows a centrally flattened circular segment or spherical dome profile. Here, a position which corresponds to the neutral position N is flattened in relation to the pole of a spherical dome, such that a more pronounced lowering stroke movement occurs with increasing deflection than in a closer vicinity of the neutral position N. FIG. 8b shows a further profile in case of which the edge regions are lowered to a greater extent, such that relatively rapid lowering of the actuation element 2 occurs in the downward-sloping region, and reduced lowering occurs with further deflection. FIG. 8c likewise shows a flattened circular segment or spherical dome profile similar to FIG. 8a. However, the flattening in the vicinity of the neutral position N constitutes a flat plateau, whereby a lowering occurs only in the edge regions. FIG. 8d corresponds substantially to a Gaussian curve, such that, during displacement out of the neutral position N, a rapid lowering initially occurs, wherein the rate of lowering continuously decreases with increasing deflection. FIG. 8e shows a modified circular segment or spherical dome profile, in the case which a local recess is formed in the region of the neutral position, whilst the profile rises again at the edges. The local recess in the region of the neutral position N constitutes a rest position for the actuation element 2, which can latch slightly by way of the control section 2.3 in the local recess. The rising edge regions constitute a delimitation, such that, from the resulting increasing stroke movement, a user receives haptic feedback that the delimitation of the actuation range A has been reached. Finally, FIG. 8f shows a profile which substantially corresponds to a double Gaussian curve with two maxima. Here, the position corresponding to the neutral position N forms a local minimum which is arranged between the double humps of the double Gaussian curve. During a displacement out of the neutral position N, there is thus initially a very intensely rising stroke movement, followed by a rapid lowering.

It is self-evident that the profiles of the control surface 3.2 may be configured as desired, for example may also be individually adapted to the requirements of a user. Furthermore, two-dimensional profiles need not imperatively be rotationally symmetrical, but may, for example in the case of an input device for a game controller, have a different profile for "left-right" displacements than for "forward-backward" displacements.

FIG. 9 shows an exchangeable control element 3.1, as can be used for example in the input device 1 illustrated in FIG. 3. The control surface 3.2 of the control element 3.1 is configured as a spherical dome 3.4 which is rotationally symmetrical with respect to the stroke direction H in the neutral position N. Formed at the edge of the spherical dome 3.4 is a circumferential flange 3.5, for example with a square outline. Two laterally opposite edges of the flange 3.5 with respect to an intended insertion direction S form the guide strips 3.3, by way of which the control element 3.1 can be inserted for example into the guide rails 5.1 of the base structure 5. Recesses 3.6 are formed on the flange 3.5, which recesses can interact as latching means with latching means formed in a correspondingly complementary manner on the base structure or on the guide rails 5.1, such that the control element 3.1 can be latched in the guide rails 3.3 in a desired position in the input device. The recesses may however also serve for locking the control element 3.1 in the desired position in the input device 1, for example by manual actuation of a locking device of the input device 1.

In a position, which corresponds to the neutral position N of the actuation element 2, at the pole of the spherical dome, the control surface 3.2 has a local depression in the form of a depression 3.7. The depression 3.7 serves as a rest position for the actuation element 2, which can latch by way of the control section 2.3 in the depression 3.7 when said actuation element reaches the neutral position N. Furthermore, the control surface has a ring-shaped encircling surface-structured region 3.8 which has, for example, encircling grooves or a fluting (by contrast to an otherwise largely smooth surface of the control surface 3.2). The region 3.8 provides the user with haptic feedback when the control section 2.3 slides over the region 3.8. Here, the ring-shaped region 3.8 is at a constant distance from the neutral position N, such that, when the region 3.8 is reached during the displacement of the actuation element 2, the user is informed, for example, of a predefined or predefinable displacement. Here, the predefined displacement may for example provide information regarding a change in the evaluation of the displacement, for example in the case of an application in a game controller, in the control of a character from "walking" to "running".

FIG. 10 shows a schematic alternative embodiment of an input device 1" according to the invention, in the case of which a control device 3" has rod-shaped supports 3.1".

An actuation element 2" is mounted movably on a base structure 5", which comprises a base plate 5.2". The actuation element 2" has a square plate 2.1" on which an actuation section 2.2" in the form of a finger support for the finger of a user is arranged centrally. The plate 2.1" is, at its corners 2.5", connected via the four supports 3.1" to the base plate 5.2" so as to be at a distance therefrom. Here, the supports 3.1" are connected in an articulated manner, for example by means of ball joints, to each corner 2.5" of the plate 2.1" and at fastening points 5.3" on the base plate 5.2". Here, the fastening points 5.2" define a square outline, corresponding to the plate 2.1", on the base plate 5.2". The plate 2.1" is thus mounted in a movably guided manner on the base plate 5.2" via the supports 3.1" in the sense of a bidirectional parallelogram guide. In a neutral position N", the plate 2.1" is arranged with its corners 2.5" in a vertical direction above the fastening points 5.3" and parallel to the base plate 5.2". A spring element (not illustrated) may be provided between the base plate 5.2" and the plate 2.1, which spring element acts on the plate 2.1" with a resetting force away from the base plate 5.2", such that the plate 2.1" is reset into the neutral position N" in the absence of external forces.

Here, the supports 3.1" control a movement of the plate 2.1" which, during a displacement effected via the actuation section 2.2", deflects laterally, in a displacement plane V" oriented parallel to the plate 2.1", in a manner guided by the supports 3.1". Here, the plate 2.1" remains oriented parallel to the base plate 5.2" owing to the parallelogram guide. The actuation element 2" thus performs a purely translational movement during the displacement into an actuation position, by way of example in FIG. 10 the actuation positions $B_1"$ and $B_2"$ indicated by dashed lines.

Owing to the parallelogram guide provided by the control device 3", a distance between the plate 2.1" and the base plate 5.2" also decreases during a lateral deflection. Accordingly, during a displacement in the displacement plane V", the actuation element 2" is lowered toward the base plate 5.2". The control of the actuation element 2" achieved in this way effects a stroke movement in the direction of a stroke direction H", which is perpendicular to the displacement plane V" and to the base plate 5.2" and the plate 2.1". Since the supports 3.1" are rigid, the control device 3" provides positive coupling of the stroke movement with the displacement movement in the displacement plane V" of the actuation element 2".

Figure 11:
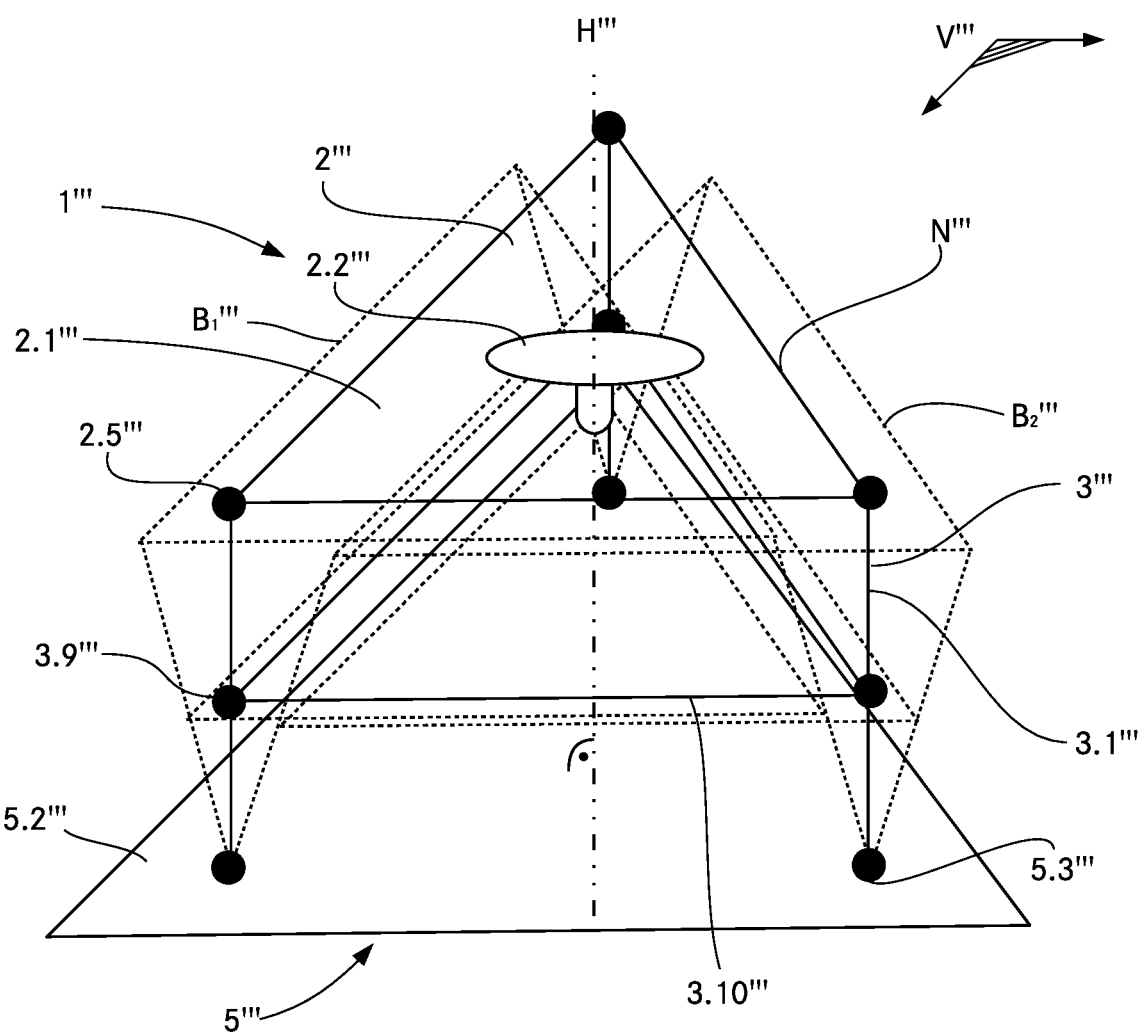

FIG. 11 shows a further schematic alternative embodiment of an input device 1''' according to the invention, in the case of which a control device 3''' has three rod-shaped supports 3.1'''.

An actuation element 2''' is mounted movably on a base structure 5''', which comprises a base plate 5.2'''. The actuation element 2''' has a triangular plate 2.1''' on which an actuation section 2.2''' in the form of a finger support for the finger of a user is arranged centrally. The plate 2.1''' is, at its corners 2.5''', connected via the three supports 3.1''' to the base plate 5.2''' so as to be at a distance therefrom. Here, the supports 3.1''' are connected in an articulated manner, for example by means of ball joints, in each case to one corner 2.5''' of the plate 2.1''' and in each case at one fastening point 5.3''' to the base plate 5.2'''. Here, the fastening points 5.3''' define a triangular outline, corresponding to the plate 2.1''', on the base plate 5.2'''. The supports 3.1''' are furthermore connected to one another in their central region at articulation points 3.9''' via struts 3.10'''. The plate 2.1''' is thus mounted in a movably guided manner on the base plate 5.2''' via the supports 3.1''' in the sense of a bidirectional parallelogram guide. Here, the struts 3.10''' prevent the plate 2.1''' from rotating relative to the base plate 5.2'''. In a neutral position N''', the plate 2.1''' is arranged with its corners 2.5''' in a vertical direction above the fastening points 5.3''' and parallel to the base plate 5.2'''. A spring element (not illustrated) may be provided between the base plate 5.2''' and the plate 2.1''', which spring element acts on the plate 2.1''' with a resetting force away from the base plate 5.2''', such that the plate 2.1''' is reset into the neutral position N''' in the absence of external forces.

The supports 3.1''' control a movement of the plate 2.1''' which, during a displacement effected via the actuation section 2.2''', deflects laterally, in a displacement plane V''' oriented parallel to the plate 2.1''', in a manner guided by the supports 3.1'''. Here, the plate 2.1''' remains oriented parallel to the base plate 5.2''' owing to the parallelogram guide. The actuation element 2''' thus performs a purely translational movement during the displacement into an actuation position, by way of example in FIG. 11 the actuation positions $B_1'''$ and $B_2'''$ indicated by dashed lines.

Owing to the parallelogram guide provided by the control device 3''', a distance between the plate 2.1''' and the base plate 5.2''' also decreases during a lateral deflection. Accordingly, during a displacement in the displacement plane V''', the actuation element 2''' is lowered toward the base plate 5.2'''. The control of the actuation element 2''' achieved in this way effects a stroke movement in the direction of a stroke direction H''', which is perpendicular to the displacement plane V''' and to the base plate 5.2''' and the plate 2.1'''. Since the supports 3.1''' are rigid, the control device 3''' provides positive coupling of the stroke movement with the displacement movement in the displacement plane V''' of the actuation element 2'''.

The input device 1''' shown in FIG. 11 may also be produced by modifying an existing game controller. For this purpose, a control lever of the existing game controller may be used as one of the supports 3.1'''. In this case, only the two further supports 3.1''' and the actuation element 2''' and the struts 3.10''' have to be added. For this purpose, on the existing game controller, the corresponding articulated connection in one of the corners 2.5''' of the actuation element 2''' has to be attached at the top of the control lever, and the articulated connections of the articulation point 3.9''' have to be attached in the center. Furthermore, in addition to the control lever, two articulated connections for the fastening points 5.3''' of the two further supports 3.1''' have to be attached to the game controller.

Figure 12:
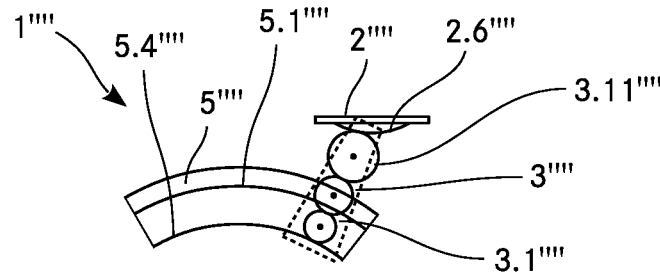

FIG. 12 shows a further schematic alternative embodiment of an input device 1'''' according to the invention, in the case of which a control device 3'''' has a single rod-shaped support 3.1''''. In FIG. 12, this support 3.1'''' is shown by dashed lines.

An actuation element 2'''' is mounted movably on a base structure 5'''', which comprises an arcuate guide rail 5.1'''', by way of the control device 3''''. Here, the support 3.1'''' is, at its lower end, mounted displaceably on the base structure 5'''' so as to be displaceable along the guide rail 5.1''''. Since the guide rail 5.1'''' is curved, the support 3.1'''' is moved up and down again in arcuate fashion, and is at the same time also pivoted in terms of its upwardly directed orientation, during the displacement along the guide rail 5.1''''. The actuation element 2'''' is mounted pivotably on the upper end of the support 3.1''''. Furthermore, three running wheels 3.11'''' are mounted, rotatably about their respective axis, in the support 3.1''''. The running wheel 3.11'''' arranged lowermost in the support 3.1'''' runs with its running surface over a running surface 5.4'''' arranged on the base structure 5''''. As a result, the lowermost running wheel 3.11'''' is rotated about its axis when the support 3.1'''' is displaced along the guide rail 5.1''''. The middle of the three running wheels 3.11'''' runs with its running surface on the running surface of the lowermost running wheel 3.11'''', whilst the uppermost of the three running wheels 3.11'''' runs with its running surface on the running surface of the middle running wheel 3.11''''. As a result, all three running wheels 3.11'''' are rotated about their axes when the support 3.1'''' is displaced along the guide rail 5.1''''. Furthermore, the actuation element 2'''' has, on its underside, a running surface 2.6'''', which runs on the running surface of the uppermost of the three running wheels 3.11''''. As a result, an orientation of the actuation element 2'''' relative to the support 3.1'''' is changed when the support 3.1'''' is moved along the guide rail 5.1''''. Through suitable selection of the radii of the three running wheels 3.11'''', the pivoting movement of the support 3.1'''' that occurs during the movement of the support 3.1'''' along the guide rail 5.1'''' can thus be compensated for, such that the actuation element 2'''' always remains oriented in space when the actuation element 2'''' is displaced and performs the stroke movement, which is controlled by the control device 3'''', up and down again when the support 3.1"" is moved along the guide rail 5.1"". Likewise, through suitable selection of the radii of the three running wheels 3.11"", a controlled pivoting movement of the actuation element 2"" can also be caused when the support 3.1"" is moved along the guide rail 5.1"". For example, the actuation element 2"" can also perform a pivoting movement that is opposite to the pivoting movement of the support 3.1"".

In a variant of the input device 1"" shown in FIG. 12, the three running wheels 3.11"" are toothed gears. In this variant, the running surface 5.4"" arranged on the base structure 5"" and the running surface 2.6"" arranged on the underside of the actuation element 2"" are each toothed in order to engage into the lowest and the uppermost of the three running wheels 3.11"", which are configured as toothed gears.

Figure 13:
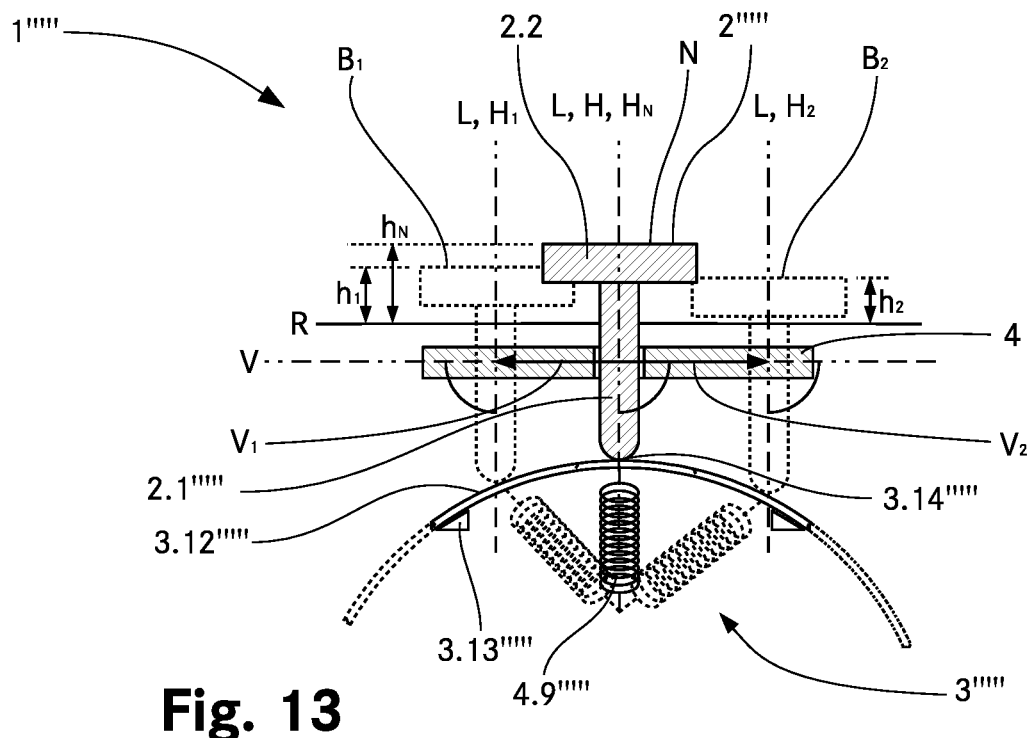

FIG. 13 shows a further schematic alternative embodiment of an input device 1""' according to the invention. This input device 1""' is largely identical to the input device 1 shown in FIG. 1 Therefore, elements of the input device 1""' shown in FIG. 13 which are identical to the corresponding elements of the input device 1 shown in FIG. 1 are denoted by the same reference designations.

By contrast to the input device 1 shown in FIG. 1, the input device 1""' shown in FIG. 13 does not have a control section 2.3 of the actuating element 2 which lies against a control surface 3.2 of a control element 3.1 of a control device 3 of the input device 1. Rather, in the input device 1""' shown in FIG. 13, at that longitudinal end of the main body 2.1""' of the actuation element 2""' which is situated opposite in the longitudinal direction L and which protrudes into the input device 1""', the main body 2.1""' is mounted with a ball joint 3.14""' on the upwardly directed outer side of a control shell 3.12""', in the shape of a segment of a spherical shell, of the control device 3""'. This control shell 3.12""' is mounted so as to lie on a horizontally oriented support ring 3.13""' of the control device 3""'. Thus, when the actuation element 2""' is displaced in the guide device 4 in the displacement plane V, the control shell 3.12""' is displaced by the actuation element 2""' over the support ring 3.13""' and tilted. As a result, the ball joint 3.14""' is also moved together with the control shell 3.12""', and the actuation element 2""' is moved in the stroke direction along the longitudinal axis L.

Figure 14:
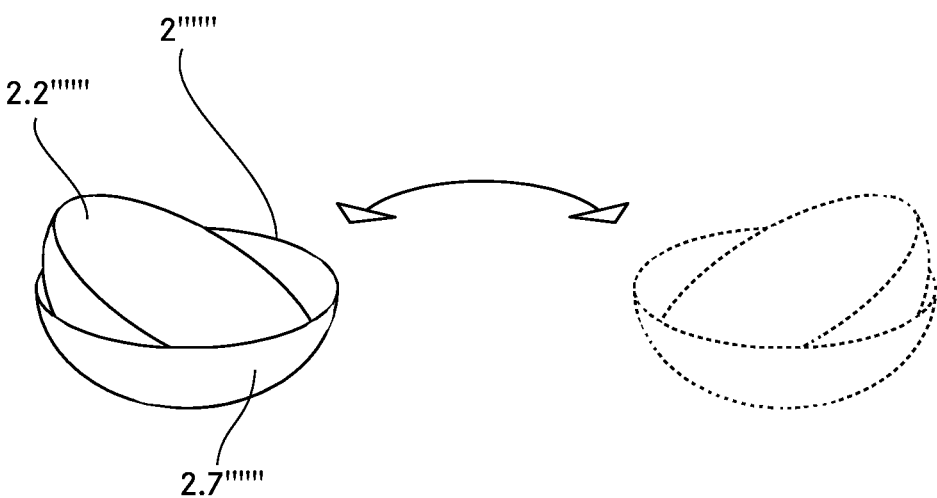

A first end of a spiral spring 4.9""' is arranged on the inner side of the control shell 3.12""', the second end of which spiral spring is attached to the same unit as the support ring 3.13""'. This spiral spring 4.9""' exerts a resetting force on the control shell 3.12""' such that the latter is reset into a position, which corresponds to the neutral position N of the actuation element 2""', when no external forces are acting. FIG. 14 shows an actuation element 2""" which can be used in an input device according to the invention, such as the input devices described above. This actuation element 2""" has an actuation section 2.2""" which is mounted pivotably in a shell 2.7""". Here, the pivoting movement of the actuation section 2.2""" is neither driven nor positively controlled. Rather, the actuation section 2.2""" is mounted on the rest of the actuation element 2""", in the present case on the shell 2.7""", so as to be freely pivotable about at least one geometrical axis. The geometrical pivot axis may be arranged statically, that is to say fixedly, relative to the rest of the actuation element 2""", or may also be displaced relative to the rest of the actuation element 2""" during a pivoting movement of the actuation section 2.2""" relative to the rest of the actuation element 2""".

Therefore, when the actuation section 2.2""" is touched by a user using a finger, in order to displace the actuation element 2""" and move it along the stroke direction, the actuation section 2.2""" can perform a pivoting movement, whereby its orientation can adapt to the finger of the user. Here, the geometrical pivot axis is preferably situated as close as possible to the point at which the actuation section 2.2""" is subjected to an exertion of force by the finger of the user during the actuation by the user. This allows an optimum transmission of force from the user to the actuation element 2""". Furthermore, the geometrical pivot axis is preferably arranged on the side of the finger of the user, and not on the side of the actuation element 2""", as viewed from the point of the exertion of force on the actuation section 2.2""" by the finger. It is thus achieved that, during the actuation by the user, the actuation section 2.2""" pivots concomitantly during the movement of the actuation element 2""" and adapts its orientation with respect to the finger of the user, rather than tilting away when a force is exerted.

As already mentioned, in the example shown in FIG. 14, the actuation section 2.2""" is mounted in the shell 2.7""" so as to be pivotable about the geometrical pivot axis. Different mechanical variants are possible for this. In a first variant, the geometrical pivot axis is a physical axle which is arranged on the shell 2.7""" on the inner side of the shell 2.7""" and on which the actuation section 2.2""" is pivotably mounted. In a second variant, the shell 2.7""" has, on its inner side, a rail which forms an arcuate path around the geometrical pivot axis, wherein the actuation section 2.2""" is mounted displaceably on this rail and is thus mounted so as to be pivotable about the geometrical pivot axis. In this case, the shell 2.7""" may for example form somewhat more than a hemispherical shell, such that the actuation section 2.2""" is held in the interior of the shell 2.7""". Equally, however, the rail may also have a T-shaped profile in cross section, wherein the actuation section 2.2""" engages behind the lateral protrusions of the rail and is thereby held on the shell 2.7""". In this case, the shell 2.7""" may also form a segment of a spherical shell smaller than a hemispherical shell.

Both a mounting by means of a physical pivot axle and a mounting by means of a rail allow in each case only a pivoting movement of the actuation section 2.2""" in one direction. In further variants, the actuation section 2.2""" is pivotably mounted on the rest of the actuation element 2""", or on the shell 2.7""", so as to be pivotable about two different, mutually angled geometrical pivot axes. In these further variants, the actuation section 2.2""" is pivotable in two directions. For this purpose, it is for example possible for an intermediate shell to be arranged between the shell 2.7""" and the actuation section 2.2""". In one example, this intermediate shell is, as described above, mounted on the shell 2.7""" by means of a physical pivot axle or by means of a rail so as to be pivotable about a first geometrical pivot axis, and the actuation section 2.2""" is mounted on the intermediate shell by means of a physical pivot axle or a rail so as to be pivotable about a second geometrical pivot axis, wherein the first geometrical pivot axis is oriented at an angle, such as a right angle, with respect to the second geometrical pivot axis.

In general, it should be noted that the base structures 5 or 5", as described here, may be provided in various ways, for example in the form of a frame, a base plate or a housing. It is likewise self-evident that the components of the input device 1, 1' or 1" may be formed entirely or partially on the base structure 5 or 5" or may also be fastened or connected as independent components to said base structure. For example, the guide slot 4.2 may be formed in a rail which is fastened to the base structure. Similarly, the one or more stops 4.4 may also be configured as separate parts, such as a collar which delimits the actuation range A and which is fastened or connected to the base structure 5. Finally, the actuation element 2 need not have an elongate main body 2.1, but may also be configured as a flat slider which, during the displacement, performs a stroke movement which is controlled by the control device. The embodiments described here thus constitute merely a schematic illustration of the basic concept of the invention, and are not to be understood as limiting in terms of design.

MODIFICATIONS OF THE EXEMPLARY EMBODIMENTS

In summary, it can be stated that providing input device for an electronic unit, in particular a game controller, which input device, in a structurally simple manner, allows ergonomic and comfortable actuation or operation by a user. By means of the stroke movement, which is controlled by the control device, during a substantially translational displacement of the actuation element, a movement profile of the actuation element is realized which, for example, is gentle on the finger joints of a user even during prolonged use. Furthermore, the stroke profile controlled in this way makes it possible for haptic feedback to be provided to the user in a manner dependent on a displacement out of a neutral position, for example when distinct positions are reached.

What is claimed is:

1. An input device comprising:
a) an actuation element configured to:
actuate the input device by a user, the actuation element having an actuation section accessible from outside the input device, wherein the actuation section is part of the actuation element;
be brought into multiple actuation positions, which define an actuation range, by the user; and
be displaced into the actuation positions by displacement in one or more displacement directions, wherein the displacement of the actuation element includes a translational movement in a transverse displacement direction, the translational movement may include components of a rotational movement;
b) an electronic position component configured to directly or indirectly detect an instantaneous actuation position of the actuation element;
wherein the actuation element is further configured to be guided, movably in an instantaneous stroke direction that is oriented perpendicular to a respectively instantaneous displacement direction in the input device; and
c) a control device, wherein during a displacement of the actuation element in the actuation range in the one or more displacement directions, a stroke movement of the actuation element in the instantaneous stroke direction is controllable or controlled in a manner dependent on the displacement of the actuation element, wherein the control device determines a stroke profile of a point of the actuation element, the stroke profile referring to a path which the point of the actuation element moves along in a case of a superposed stroke movement and displacement.

2. The input device as claimed in claim 1, wherein all instantaneous displacement directions lie strictly in the displacement plane, and the instantaneous stroke directions are thus perpendicular to the displacement plane, and oriented along a common stroke direction, in every actuation position of the actuation element.

3. The input device as claimed in claim 1, further comprising a guide element, wherein the actuation element is mounted in the input device, so as to be guided displaceably in the one or more displacement directions and movably in the respectively instantaneous stroke direction by the guide element.

4. The input device as claimed in claim 1, further comprising an elastic element, wherein the actuation element is mounted in the input device, displaceably in the one or more displacement directions and movably in the respectively instantaneous stroke direction, by the elastic element.

5. The input device as claimed in claim 1, wherein the control device is configured such that the actuation element is at least partially lowerable or lowered into the input device in the respectively instantaneous stroke direction when said actuation element is displaced, in the one or more displacement directions.

6. The input device as claimed in claim 1, wherein the control device comprises a control element with a control surface, and the actuation element has a control section for interaction with the control surface, wherein the control surface is configured, and arranged with respect to the actuation element, such that, during the displacement of the actuation element in the one or more displacement directions, the stroke movement of the actuation element in the respectively instantaneous stroke direction is controllable or controlled by interaction of the control section with the control surface.

7. The input device as claimed in claim 6, wherein the control section protrudes into the input device in the respectively instantaneous stroke direction, and the control section is arranged in the input device opposite the control surface in the respectively instantaneous stroke direction.

8. The input device as claimed in claim 6, wherein the actuation element is preloadable or preloaded in the respectively instantaneous stroke direction against the control surface such that the control section is pressed against the control surface.

9. The input device as claimed in claim 6, wherein the control surface has one or more surface-structured regions, and when said control surface is passed over with the control section, haptic feedback can be generated for the user at the actuation section.

10. The input device as claimed in claim 6, wherein the control surface has a recess at one or more points, which recess defines a temporary rest position for the control section.

11. The input device as claimed in claim 6, wherein the control element comprises a control motion link on which the control surface is formed, and the control section interacts with the control motion link such that positive control of the stroke movement in a manner dependent on the displacement of the actuation element in the one or more displacement directions is implemented.

12. The input device as claimed in claim 6, wherein the control surface is, at least in certain regions, with respect to at least one of the one or more displacement directions, configured, so as to be curved in the respectively instantaneous stroke direction, toward or away from the instantaneous stroke direction.

13. The input device as claimed in claim 12, wherein the control surface is configured so as to be curved substantially in the manner of a dome so as to be convexly arched toward the actuation element, wherein a profile of the curved control surface has a maximum at a point which corresponds to the position of the control section in a neutral position of the actuation element, and wherein the control section is arranged in a pole region of the control surface when the actuation element is situated in the neutral position.

14. The input device as claimed in claim 6, wherein the actuation element is configured in a form of an elongate lever, wherein a longitudinal axis of the elongate lever is oriented in a respectively instantaneous stroke direction in every actuation position, wherein, the actuation section is formed at a first longitudinal end of the actuation element and the control section is formed at a second longitudinal end situated opposite the actuation section in a longitudinal direction.

15. The input device as claimed in claim 6, wherein the control element is arranged so as to be deflectable, in the input device in such a way that, when a force acts on the actuation element in the respectively instantaneous stroke direction, the control element is deflectable by means of the control section.

16. The input device as claimed in claim 6, wherein the control element is arranged in the input device such that the control element can be adjusted by the user.

17. The input device as claimed in claim 6, wherein the control element is arranged in the input device such that the control element can be exchanged by a user, such that different control elements with different control surfaces can be inserted into the input device.

18. The input device as claimed in claim 17, wherein the control element is fastened by a fastener.

19. An electronic unit, comprising:

a) an actuation element configured to:

actuate the electronic unit by a user, having an actuation section accessible from outside the electronic unit, wherein the actuation section is part of the actuation element;

be brought into multiple actuation positions, which define an actuation range, and be displaced into the actuation positions by displacement in one or more displacement directions, wherein the displacement of the actuation element includes a translational movement in a transverse displacement direction, the translational movement may include components of a rotational movement;

b) an electronic position component configured to directly or indirectly detect an instantaneous actuation position of the actuation element, wherein the actuation element is further configured to be guided, movably in an instantaneous stroke direction that is oriented perpendicular to a respectively instantaneous displacement direction in the electronic unit, and c) a control device, wherein during a displacement of the actuation element in the actuation range in the one or more displacement directions, a stroke movement of the actuation element in the instantaneous stroke direction is controllable or controlled in a manner dependent on the displacement of the actuation element, wherein the control device determines a stroke profile of a point of the actuation element, the stroke profile referring to a path which the point of the actuation element moves along in a case of a superposed stroke movement and displacement.

20. The electronic unit as claimed in claim 19, wherein the electronic unit is a game controller.

* * * * *